United States Patent [19]

Doll et al.

[11] Patent Number: 5,610,920
[45] Date of Patent: Mar. 11, 1997

[54] COUPLING OF VOICE AND COMPUTER RESOURCES OVER NETWORKS

[75] Inventors: Michael J. Doll, Rosemount; Donald J. Kleven, Bloomington; Joseph Pobiel, Eden Prairie, all of Minn.

[73] Assignee: Lockheed Martin Corporation, Bethesda, Md.

[21] Appl. No.: 619,899

[22] Filed: Mar. 20, 1996

[51] Int. Cl.$^6$ ........................................... H04J 3/26
[52] U.S. Cl. ........................... 370/389; 370/260; 379/159
[58] Field of Search .................. 370/94.2, 62, 79, 370/94.1, 80, 84, 110.1, 85.7, 85.6; 379/67, 68, 70, 80, 88, 90, 110, 202

[56] References Cited

U.S. PATENT DOCUMENTS

| | | | |
|---|---|---|---|
| 4,516,239 | 5/1985 | Maxemchuk | 370/94.2 |
| 4,710,917 | 12/1987 | Tompkins et al. | 370/62 |
| 4,792,849 | 12/1988 | McCalley et al. | 358/86 |
| 4,866,704 | 9/1989 | Bergman | 370/85.4 |
| 4,905,219 | 2/1990 | Barr et al. | 370/4 |
| 5,124,980 | 6/1992 | Maki | 370/77 |
| 5,245,322 | 9/1993 | Dinwiddie, Jr. et al. | 345/115 |
| 5,274,680 | 12/1993 | Sorton et al. | 375/118 |
| 5,278,687 | 1/1994 | Jannson et al. | 359/125 |
| 5,291,492 | 3/1994 | Andrews et al. | 370/110.1 |
| 5,318,450 | 6/1994 | Carver | 434/336 |
| 5,333,266 | 7/1994 | Boaz et al. | 395/200 |
| 5,341,347 | 8/1994 | Ludwig | 367/129 |
| 5,343,466 | 8/1994 | Kawamura | 370/54 |
| 5,351,235 | 9/1994 | Lahtinen | 370/58.1 |
| 5,351,237 | 9/1994 | Shinohara et al. | 370/58.3 |
| 5,351,276 | 9/1994 | Doll, Jr. et al. | 379/67 |
| 5,384,772 | 1/1995 | Marshall | 370/62 |
| 5,422,883 | 6/1995 | Hauris et al. | 370/62 |
| 5,434,848 | 7/1995 | Chimento, Jr. et al. | 370/17 |
| 5,440,548 | 8/1995 | Denissen | 370/60 |
| 5,440,549 | 8/1995 | Min et al. | 370/60 |

Primary Examiner—Wellington Chin
Assistant Examiner—Huy D. Vu
Attorney, Agent, or Firm—Glenn W. Bowen

[57] ABSTRACT

Radio and workstation nodes are operated together in a network which may be either a LAN or a WAN network. The audio is sampled from up to 16 voice sources (radios or intercoms) at a 125 micro second rate and converted into a 16-bit representation by the A-D converters associated with a digital signal processor (DSP) at the radio or voice node. The samples are then captured by the DSP and processed by the voice sampler. When the DSP voice detection software notices a signal which meets the voice detection criteria, a process is started which collects audio sample packets and continues to run as long as the voice detection criteria on a specific channel are met. These audio sample packets are assigned sequence tags and placed into a user datagram protocol (UDP) message addressed to the receiving DSP by the voice distribution process. The network protocols for UDP packets provide delivery to the correct DSP. At the receiving DSP the UDP messages are received and audio sample packets destined for playback at the specific DSP are buffered for an automatically determined delay period by the adaptive buffering algorithm of the voice mix/playout process. At the workstation nodes voice signals from a number of independent voice sources may be selected by the operator and mixed at operator selectable volume levels through the voice mix/playout process. The header information identifies which radio the packet is for and contains the identifier of the workstation node holding push-to-talk (PTT) control for the radio.

1 Claim, 2 Drawing Sheets

COUPLING OF VOICE AND COMPUTER RESOURCES OVER NETWORKS

This Application claims the benefit of U.S. Provisional Application No. 60/0001,314, filed Jul. 21, 1995, in the names of Michael John Doll, Rosemount, Minn.; Donald John Kleven, Bloomington, Minn. and Joseph Pobiel, Eden Prairie, Minn.

DISCUSSION OF THE PRIOR ART

Prior art tended to focus on specific applications, e.g., a telephone server system or a video conferencing system, and not on an integrated approach to voice, data and video communications over crypto/radio links. Examples of patents that illustrate such an approach are as follows:

U.S. Pat. No. 4,866,704, issued to Bergman and entitled "Fiber Optic Voice/Data Network". This patent describes a method for multiplexing digitized voice information onto a token-ring bus using a voice interface module which multiplexes multiple telephone channels into a single packet of information, The application is to provide a PABX trunk channel using an integrated voice/data network. Adaptive methods of buffer control are defined, one using packet duplication and packet drop-out to prevent buffer underflow and overflow and another using clock speed-up and slow-down to prevent overflow and underflow. Packet transport mechanisms using UDP/IP and TCP/IP are proposed, as well as real-time applications for voice, video and synthetic aperture radar (SAR). While the bus of a token ring bus is similar, the Bergman system does not use:

1) voice silence detection for buffer control;

2) multicasting protocol for network transmission;

3) radio/crypto information transfer;

4) single user information transfer;

5) gaphical user interfaces (GUIs) or a common man-machine interface (MMI); and 6) remote control of communication equipment.

U.S. Pat. No. 5,351,276, issued to Doll, Jr., et al., entitled "Digital/Audio Interactive Communication Network". This patent describes a store-and forward document server which allows users to integrate text, image and voice into a single binary bundle (call "object"); store the object on one or more file servers; and allow other users to retrieve the "object"; view text and imagery; and listen to the integrated voice. The system uses voice processing hardware as well as open systems architecture (OSA) hardware and networks. The system does not address:

1) real-time distribution of voice, data and video (moving images);

2) use of multi-casting protocols for packet distribution;

3) operator access to communication equipment (i.e., radio/crypto) from the LAN;

4) graphical user interface (GUI) for operator access to communication equipment; and 5) remote control of communication equipment.

U.S. Pat. No. 5,351,237, issued to Shinohara, et al. entitled "Network System Comprising a Plurality of LANs Connected to an ISDN via a Plurality of Routers, Each Capable of Automatically Creating a Table for Storing Router Information" This patent describes a bridging system to create a virtual LAN topology between remotely located physical LANs using an integrated services digital network (ISDN) as the network to interconnect the physically disparate LANs. The system describes Internet protocol (IP) address assignments and methods for a routing protocol.

U.S. Pat. No. 5,341,347, issued to Ludwig et al. and entitled "Communication Network System Data and Video with Distributed Call Processing" This patent describes a packetized voice distribution system using a token ring bus architecture. The key elements of the invention are (a) ring distribution topology, (b) packet sizes which are limited to reduce delay and allow integration of other data on the ring, (c) distributed call control which removes the need for a central controller, (d) voice conferencing feature for a 3-party conference using a packet adding system, (e) call processing for a gateway connection to an external network, and (f) priority mechanism for giving voice highest priority for access to the LAN. The system does not address:

1) access to radio communications channels;

2) use of multi-casting protocols for voice distribution;

3) integration of voice, data, and video in a GUI controlled man-machine-interface;

4) remote control using SNMP; and 5) conferencing of many users using DSP technology located at each node.

This system differs from the present invention with regard to the application of the distribution (i.e., communication access over radio/crypto channels) the method of distribution (i.e., multicasting protocols), and the method of processing and presentation of the messages (DSP conferencing, integrated GUI).

U.S. Pat. No. 4,792,849, issued to McCalley et al. and entitled "Digital Interactive Communications Systems" This patent describes an invention for providing a 2-way interactive cable TV system for use in home shopping network applications where a subscriber uses the telephone keypad to request video and/or audio descriptions of products for sale. The system uses LAN technology to distribute the processing.

U.S. Pat. No. 5,245,322, issued to Dinwiddle, Jr., et al. and entitled "Bus Architecture for a Multimedia System" This patent describes the invention of a media bus architecture for a multimedia system. The system can be imbedded in a PC and includes standard PC components, including system bus (i.e., AT bus); input and display units (keyboard & monitor); storage devices (hard drive and floppy). The media bus is an added bus to the PC which distributes analog and digitized video and audio information to/from CODEC devices to processors and graphics accelerators.

U.S. Pat. No. 5,351,235, issued to Lahtinen and entitled "Method for Relaying information in an InteGrated Services Network" This invention describes a method for distributing database information from user to user based on short message service (SMS) transmissions from cellular or other land mobile networks. This system makes for efficient use of the RF bandwidth, while providing the capability of transmitting large amounts of useful information to the desired destination.

U.S. Pat. No. 5,291,492, issued to Andrews et al. and entitled "Externally Controlled Call Processing System", and U.S. Pat. No. 5,036,535, issued to Gechter, et al. and entitled "Switches Automatic Call Distribution System" These patents describe a system which automatically controls telephone calls in a telephone network. Using call control and status information available in X.25 and ISDN messages, the computer controls the dialing, answering, and switching of incoming and outgoing calls in a telephone network. The Controlling computers are networked using a LAN and a set of application programming interfaces (API) are described to allow a software program to be implemented to perform sequence control instructions. These patents do not describe distribution of multimedia information over LAN or an integrated GUI for operator access to radio/crypto communications equipment.

U.S. Pat. No. 5,278,687, issued to Jannson, et al. and entitled "Multiwavelength Data Communication Fiber Link" A method of optical multiplexing of video information is described to facilitate multiplexing many video signals onto a single fiber optic cable. This invention does not relate to a system of integrating data, digitized voice and digitized video onto LANs or the method for operator access of communication equipment (i.e., radio/crypto) via an integrated graphical user interface (GUI).

U.S. Pat. No. 5,274,680, issued to Sorton et al. and entitled "Device for the Transmission of Synchronous Information by an Synchronous Network, Notably an ATm Newtork" This patent describes an adaptive buffer and clock management system for end points on an asynchronous communications network, notably ATM. The invention allows for transmission and reception of synchronous data over the asynchronous network by applying intelligent buffer management to mitigate delay variability, cell insertion and extraction rules for long interruptions or incorrectly routed cells, and a PLL servo circuit to synchronize end-to-end clocks with frequency error or wander. The system uses some well known buffer management and PLL techniques to retain virtual synchronization across a network.

U.S. Pat. No. 5,124,980, issued to Maki and entitled "Synchronous Multiport Digital 2-Way/Communications Network Using T1 PCM on a CATV Cable". This invention describes a method to multiplex synchronized T1 information on a cable TV or LAN cable using frequency division multiplexing (FDM) and a novel method for transmitting clock synchronization information across the network. This invention is used to transmit baseband data or digitized video and audio onto a LAN system. This invention relies on the electrical properties of the cable distribution system to add FDM signals on top of the baseband digital information.

U.S. Pat. No. 4,905,219, issued to Barr et al. and entitled "Three Level Distributed Control for Networking I/O Devices" This invention describes a method of distributing the task of routing digitized data, voice or video information across a network of LANs. The control for this routing is distributed to three distinct levels of control, each with distinct tasks and capabilities. The purpose of this method is to provide increased efficiency in the disbursement of routing control. The system of this patent has a proprietary routing system, not one based on an OSA system.

U.S. Pat. No. 4,710,917, issued to Tompkins et al. and entitled "Video Conferencing Network" and U.S. Pat. No. 4,847,829 issued to Tompkins et al. and entitled "Video Conferencinq Network" These patents describe a workstation video teleconferencing system employing frequency division multiplexing (FDM) to multiplex video, audio, and/or data to a central mixer which mixes the information and returns the mixed information back to each workstation. A data link interface is described to provide VTC between remote sites over a satellite network. A LAN implementation option is described to distribute baseband data and control information, thus simplifying the design of the FDM unit. Call setup, control and removal sequences are described. This patent does not describe integration of voice, video and data information over a LAN or the integration of services into a graphical user interface (GUI) software package. Workstation operator access to radios, cryptos or other communication equipment is not described.

BACKGROUND OF THE INVENTION

Prior voice distribution systems for networks did not adequately provide remote access to radios through standard wide and local area nets from a workstation or a personal computer (PC). They lacked the necessary robust voice quality and minimal latency desirable in local area network (LAN) and wide area network (WAN) environments.

SUMMARY OF THE INVENTION

A system for exchanging voice messages over a network is implemented which includes at least two analog voice signal transceivers located at different points of the network. The network transmits packets between selected ones of the transceivers. Communication nodes are coupled to the network and to various transceivers. The communication nodes have:

(a) a sampling device which samples transmitted analog voice signals on a periodic basis;

(b) an analog-to-digital converter which converts the sampled analog voice signals to digital signals;

(c) a second sampling device which samples the digital signals on a periodic basis and packetizes the sampled digital signals;

(d) A verification and assignment means which verifies that the packetized sampled digital signals meet predefined criteria and assigns sequence tags and headers to these packets; and (e) a distribution device which sends these packets to the network.

At least one of the transceivers is coupled to a device which receives and converts packets sent from the network means to analog voice signals for re-transmission to other transceivers.

DESCRIPTION OF THE DRAWINGS

The present invention is described by reference to drawings in which:

FIGS. 2a and 2b show a process diagram which illustrates an implementation of the invention.

TECHNICAL DESCRIPTION OF THE INVENTION

The voice distribution system (VDS) software of the present invention is targetable to a number of signal processing environments. It supports OSI multicast protocol for LAN conferencing by use of an adaptive buffering algorithm. Radio push-to-talk (PTT) signals are included in the packet information. Voice distribution to radios through local and wide area networks is accomplished with the system. This invention provides intercom capability to facilitate audio conference among workstations and communication services to radios over both LAN and WAN networks and both intercom and radio services that use either TCP/IP or OSI protocols.

Figure 1:
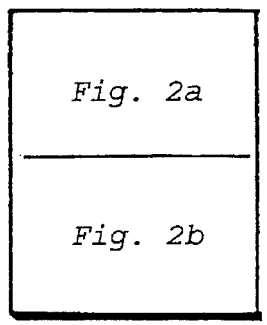
FIG. 1 shows how
Figure 2A:
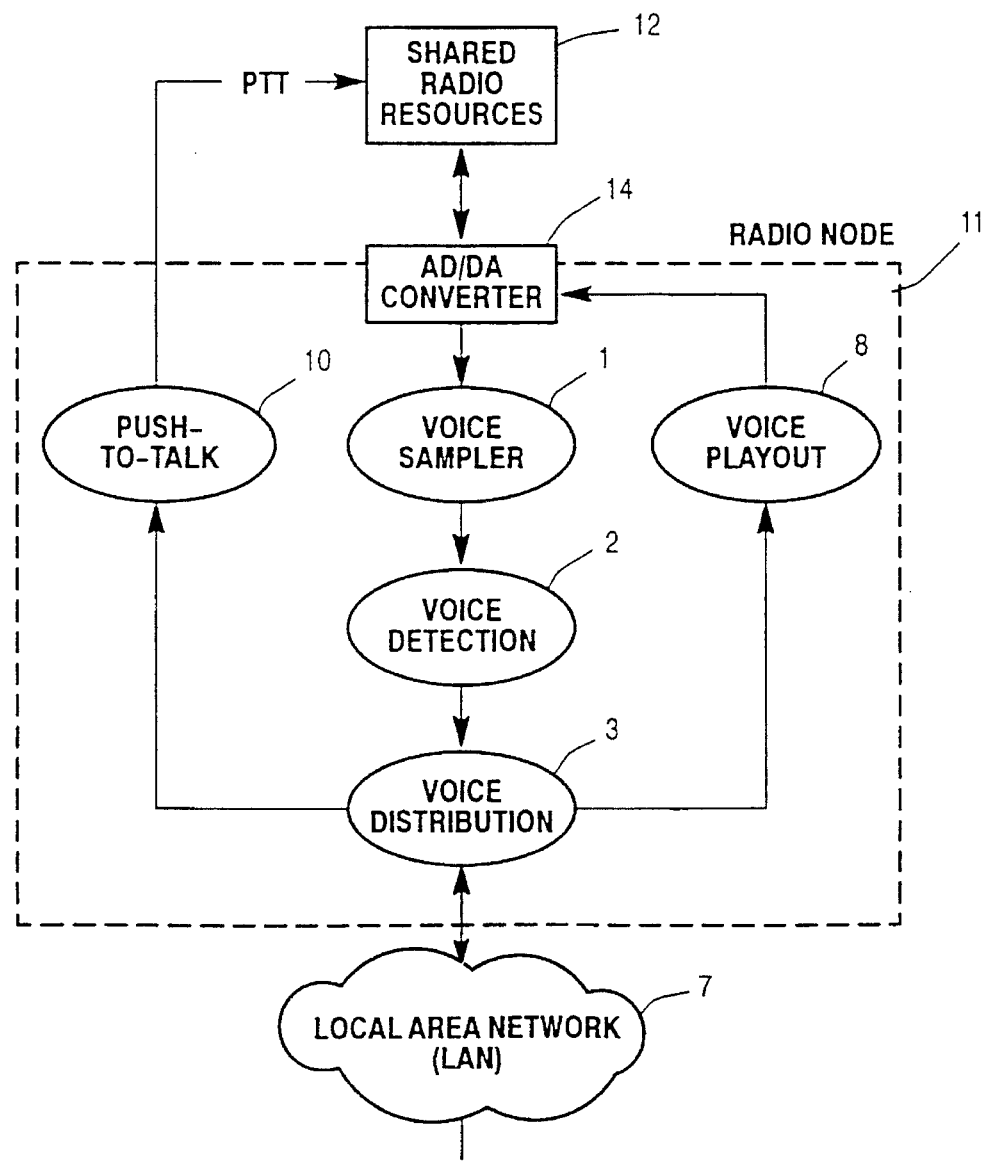
FIGS. 2a and 2b are positioned relative to each other.
Figure 2B:
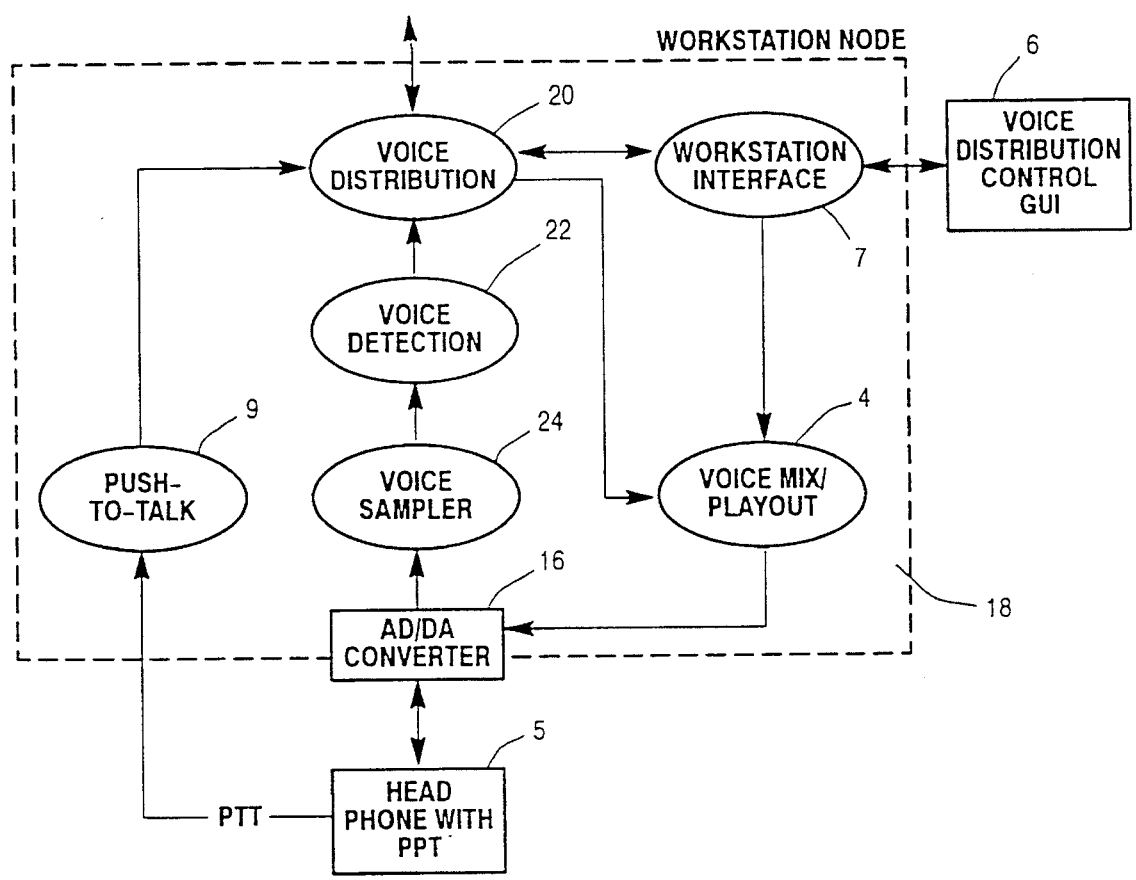

The interface between a shared radio node digital signal processor (DSP) and the workstation node DSPs at each of the workstations is very flexible. The various nodes may start at any time and be added or removed without adverse effects. The workstation node DSPs periodically send message packets addressed to the radio node DSP indicating from which radios (possibly none) the workstation DSP wishes to receive voice. The term "workstation" as used herein encompasses both workstations and personal and other computers. The term "radio" includes both the "radios" or voice nodes and intercoms and other voice sources. FIGS. 2a and 2b depict the overall structure of the voice distribution software and show the relationship between two different types of DSP nodes (radio and workstation).

The audio is sampled from up to 16 voice sources called "shared radio resources" in FIG. 2a (radios or intercoms) at a 125 micro second rate and converted into a 16-bit representation by the A-D converters of the A-D/D-A converter unit 14 associated with the DSP. These samples from the shared radio resources 12 are then captured by the DSP and processed by the voice sampler (Item 1) every eight milliseconds. When the DSP voice detection (Item 2) software notices a signal which meets the voice detection criteria, a process is started which collects audio sample packets and continues to run as long as the voice detection criteria on a specific channel are met. These audio sample packets are assigned sequence tags and placed into a user datagram protocol (UDP) message addressed to the receiving DSP by the voice distribution process (Item 3). After voice is detected, audio sample packets are sent at the adaptable packet rate until voice is no longer detected. Audio sample packets from the multiple audio sources may be placed in the same UDP message. The UDP message is sent to the receiving DSP through the services of the network interface/driver software. The network protocols for UDP packets provide delivery to the correct DSP.

At the receiving DSP of the workstation, the UDP messages are received and audio sample packets destined for playback at the specific DSP are buffered for an automatically determined delay period by the adaptive buffering algorithm of the voice mix/playout process (Item 4). Conventional statistical methods are used to determine the degree of uncertainty in packet delivery time and adjust packet buffering to minimize gaps in the playout due to any non-deterministic delivery times that might develop in the LAN/WAN caused by variations in load. The sequenced tags are used to place the packets in the correct playout order, and the packets are sent to the D-A converter in the A-D/D-A converter unit 16 at a rate that matches the packet input rate at the sending DSP. At the workstation nodes voice from a number of independent sources (radios and intercoms) may be selected by the operator and mixed at operator selectable volume levels through the voice mix/playout process (Item 4). A master volume control (adjustable via a graphics user interface (GUI) on the workstation) is also provided to control the overall volume of the mixed voice. At the radio or voice node the voice playout process (item 8) does not mix sources since only one source is allowed to send to a radio at a time.

Whenever the radio node DSP has voice sample packets to send, it sends them to all workstation node DSPs in the connection table that have selected reception from any radios. The message sent by the radio node DSP consists of possibly a packet for each radio. Each packet consists of header information followed (when needed) by the voice samples. The header information identifies which workstation the packet is for and contains the identifier of the radio node being operated by the operator holding push-to-talk (PTT) control for the radio (a zero value indicating none). This is the mechanism for the radio node DSPs to determine if they have received control. The packet header also indicates whether or not a voice sample is present following the header. The radio node DSP will send a packet for a radio at a certain minimum time interval even if there are no voice samples from it so that the workstation DSPs may determine the PTT holders.

The PTT control is initiated by the operator at a workstation by pressing the PTT switch (item 9) attached to the headset/transmitter (item 5) or from the GUI (item 6) on the workstation. When PTT switch closure is sensed, the PTT input process activates the voice distribution process 20, and if the DSP 18 determines it has voice samples to send, it sends them from the head-phone/transistor 5 to the radio node DSP through the A-D/D-A converter unit 16, the voice sampler processor 24, the voice detection processor 22 and the voice distribution process 20. In the packet header for these samples is a bit encoding of the radios to which the voice samples are destined. This is an indication to the radio node DSP 11 that PTT control is desired by the workstation for each of these radios. If there is no holder of control then it is granted at this time. A PTT signal is sent to the radio by the PTT output (Item 10) process, and the voice samples are queued for playout by the voice playout process (Item 8). Also, the radio status message packets, containing the new PTT holder from those radios, are scheduled to be sent within the 16 millisecond cycle of operation. Hence the workstation node DSP will receive a timely notification of its success. If control is not granted, then no special message is scheduled or sent. The selected radio resources are thus able to transmit received messages from remote transmitters to the workstations and also to relay voice messages from the workstations to each other.

While the operator is pressing the PTT switch he might not be speaking. During such a period of time the workstation node DSP will send a packet containing no voice samples but indicating the radios it desires to control just as it does when it has voice samples. These packets are sent at a rate of about eight times a second. The radio node DSP times out the PTT holder if it has received neither the control packet without the voice samples nor one with the voice samples for about one-half second. The status of the PTT switch (along with other voice distribution controls) may be read through the workstation interface process (Item 7) and set by the applications software or graphics user interface software operating in the controlling workstation or PC. When the operator releases the PTT switch, the workstation node DSP sends no special indication to release control, it simply stops sending and the radio node DSP times out the control.

Whenever the radio node DSP begins functioning, it starts to receive these packets from all workstation node DSPs that are functioning. It maintains a connection table with an entry for each workstation node DSP from which it is receiving such messages. The entries contain the radio selections and the network address of other workstations to be connected. The radio node DSP times out the connection and clears the entry it has received from the workstation node for a certain period of time (about 10 seconds). This prevents it from sending out radio voice packets forever to a workstation node that has terminated operation without a clean shutdown.

The system thus provides real-time voice access to remotely located radios as well as voice conferencing on a SAFENET, FDDI or Ethernet network. It has application in small and large tactical communication environments, including but not limited to combat battle management centers, command and control centers and air traffic control centers. The system has applications wherever remote control of communication equipment is advantageous, including but not limited to ship and shore based radio room systems.

What is claimed is:

1. A system for exchanging voice messages over a network comprising, (a) at least one first analog voice signal transmitting and receiving means for transmitting voice signals and for receiving voice signals to be re-transmitted, (b) at least one second analog voice signal transmitting and receiving means for transmitting voice signals and for receiving voice signals, (c) network means coupled for transmitting packets originating at said first analog voice signal transmitting and receiving means to selected ones of said second analog voice signal transmitting means and for transmitting packets originating at said second analog voice signal transmitting and receiving means to selected ones of said first analog voice transmitting and receiving means for re-transmission to others of said second analog voice signal transmitting and receiving means, (d) first communication node means coupled to said network means and to said at least one first analog voice signal transmitting and receiving means comprising, (1) first sampling means coupled to said first analog voice signal transmitting and receiving means for sampling said analog voice signals transmitted from each of said first analog voice signal transmitting means on a periodic basis, (2) first analog-to-digital converter means coupled to said first node means for converting said sampled analog voice signals to digital signals and comprising, (3) second sampling means coupled to said first analog-to-digital converter means for sampling said digital signals on a periodic basis and for packetizing said sampled digital signals, (4) first verification and assignment means coupled to said second sampling means for verifying that said packetized sampled digital signals from said second sampling means meet predefined criteria and for assigning sequence tags and headers to said packets, (5) first distribution means coupled to said verification and assigning means and to said network means for sending said packets to said network means which meet said predefined criteria and for receiving packets from said network means, (6) first digital-to-analog converter means coupled to said network means and to said first analog voice transmitting and receiving means for receiving and converting said packets sent from said network means to analog voice signals for re-transmission, (e) second node means coupled to said network means and individually to each of said second at least one analog voice signal transmitting and receiving means each of which comprises:

(1) second analog-to-digital converter means coupled to said associated second analog voice signal transmitting and receiving means for converting analog voice signals to digital signals, (2) third sampling means coupled to said second analog-to-digital converter means for sampling said digital signals on a periodic basis, (3) second verification and assigning means coupled to said third sampling means for verifying that said packetized digital signals from said third sampling means meet predefined criteria and for assigning sequence tags and headers to said packets, (4) second distribution means coupled to said verification and assigning means and to said network for transmitting said packets to said network means which meet said predefined criteria and for receiving packets from said network means, (5) second digital-to-analog conversion means coupled to said network means and said second analog voice signal transmitting and receiving means, distribution means for receiving and converting said packets sent from said network means to said second analog voice signal transmitting and receiving means to analog voice signals, (f) a plurality of voice communication means coupled to the output of said second digital-to-analog convertor means which comprises voice generating means for generating voice outputs.

* * * * *